3,084,129
GLASS FRIT VEHICLE COMPRISING NORMAL BUTYL METHACRYLATE POLYMER AND MONOHYDROXY ALIPHATIC ALCOHOL

Lewis Charles Hoffman, Scotch Plains, N.J., assignor to E. I. du Pont de Nemours and Company, Wilmington, Del., a corporation of Delaware
No Drawing. Filed Jan. 29, 1960, Ser. No. 5,345
3 Claims. (Cl. 260—17)

This invention relates to a glass frit vehicle and more particularly, it relates to a new and improved composition of a thermofluid vehicle for glass frits or glass colors. The vehicles of this invention have particular utility for the rapid super-imposition of a plurality of colored glass frits on metal or ceramic surfaces.

Thermofluid vehicles have been used for some time in the application of colored glass frits on surfaces on which they are to be fired for the production of enamelled surfaces. Such vehicles are available commercially as mixtures of thermoplastic resins and waxes or wax-like materials and are referred to generally as "resin-wax type" thermofluid vehicles or as mixtures solely of waxes and wax-like materials and are referred to as "all-wax type" thermofluid vehicles.

Since the various types of thermofluid vehicles function in substantially the same manner, they are sometimes mixed in the trade by users thereof, especially when switching from one to another type of vehicle. Such mixing of vehicles has led to a great deal of difficulty and failure by reason of the incompatibility with each other of most of the thermofluid vehicles sold on the market.

Another common objection to many thermofluid vehicles is the relatively high carbonaceous residue remaining after firing of the glass frit colors.

It is, therefore, an object of this invention to provide a new and improved composition of thermofluid glass frit vehicle.

It is another object to provide a composition of thermofluid glass frit vehicle that will have a very low carbonaceous residue upon firing of the glass frit.

It is another object to provide a composition of thermofluid glass frit vehicle that will be compatible with "resin-wax" and "all-wax" commercial thermofluid vehicles.

Other objects of the invention will appear hereinafter.

The objects of this invention will be achieved by the provision of a composition of thermofluid vehicle for use in glass frit application containing, in combination, polymerized normal butyl methacrylate and a saturated monohydroxy alcohol of 12 to 32 carbon chain length. These two materials should be present in a ratio of 7 to 30 parts by weight of the poly n-butyl methacrylate and 63 to 88 parts by weight of the saturated monohydroxy alcohol.

In many instances it will be preferred to add a small amount of ethyl cellulose as a levelling agent and an anionic surface-active agent composed of the reaction product of POCl₃ and a saturated monohydroxy alcohol having 8 to 18 carbon atoms. The ethyl cellulose may advantageously be present in an amount of up to 5% by weight and the anionic surface-active agent may be present in an amount up to 7% by weight.

Although it is preferred that the thermofluid vehicle of this invention consist substantially entirely of the aforesaid methacrylate polymer and monohydroxy alcohol, with or without the ethyl cellulose and anionic surface-active agent, up to 40% by weight of the vehicle may be comprised of other resin-wax or all-wax thermofluid vehicles or other known resins or waxes as used in thermofluid vehicles.

It is of the essence of this invention that the methacrylate polymer and monohydroxy alcohol be present in combination in the vehicle in the aforesaid ratio of 7 to 30 parts by weight of the polymer and 63 to 88 parts by weight of the alcohol. The use of the methacrylate polymer with other waxes and wax-like materials in the absence of the above ratio of monohydroxy alcohol will fail to produce a vehicle that will be satisfactorily compatible with other commercial thermofluid vehicles. On the other hand, the use of other resins in place of n-butyl methacrylate polymer with the monohydroxy alcohol will fail to produce a vehicle that is fully satisfactory in respect to carbonaceous residue upon firing.

Normal butyl methacrylate polymer is the only acrylic resin found suitable for the purposes of the present invention. Normal butyl methacrylate polymers as heretofore made commercially, for example, "Lucite 44," made and sold by E. I. du Pont de Nemours and Company, may have a viscosity of between about 20 and 100 seconds for a 43% solution of the polymer in toluene at 25° C. when measured in a Parlin cup. By use of so-called chain stoppers, lower viscosity polymers may be made. Any of such polymers of n-butyl methacrylate are suitable for this purpose. Such polymer possesses the required solubility and solution stability in waxes and wax-like materials. It is lower in melting point than other methacrylate polymers so that the screen stencil used in applying the glass colors can be operated at a low temperature, avoiding heat deterioration.

Any saturated monohydroxy aliphatic alcohol solid at room temperature can be used. More specifically, these alcohols having a carbon chain length of 12 to 32 are useful for this purpose. The monohydroxy alcohols may be single alcohols or mixtures of such alcohols. Mixtures of fatty alcohols highly useful for the preparation of vehicle compositions of this invention are exemplified by the following commercial substances:

(1) "Siponol TX" (a mixed fatty alcohol made and sold by American Alcolac Corp.) containing $C_{12}$-$C_{14}$, 8% and $C_{16}$-$C_{18}$, 92%, melting point: 48–52° C.

(2) "Adol 64" (a mixed fatty alcohol made and sold by Archer-Daniels-Midland Corp.) containing $C_{16}$, 24.3%, $C_{18}$, 68.6%, $C_{20}$, 7.1%.

(3) "Dytol E-46" (made and sold by Rohm and Haas Corp.) containing $C_{14}$, 1.2%, $C_{16}$, 34.4%, $C_{18}$, 64.4%.

(4) "Lorol 28" (made and sold by E. I. du Pont de Nemours and Company as technical grade stearyl alcohol), melting point 58° C.

1-dodecanol, melting point 24°, or any similar fatty alcohol to and including 1-dotriacontanol ($C_{32}$) may be used. In order that the vehicle be sufficiently stable at least 37% by weight of the vehicle has to be composed of fatty alcohol. Large amounts of paraffin, stearic acid, microcrystalline waxes, carnauba wax or the like either do not fully dissolve the n-butyl methacrylate polymer or the solutions are unstable at or near the melting point allowing separation of the components to take place.

Ethyl cellulose is an optional component in the vehicle. It is added only where it is particularly desirable to have an improvement in levelling of the applied glass color composition during firing. The low viscosity (5% solution in toluene-ethanol 9–11 centipoises or lower) is preferred for reasons of better solubility.

The other optional ingredient is the anionic surface-active agent composed of the reaction product of POCl₃ and a saturated monohydroxy aliphatic alcohol having 8 to 18 carbon atoms. These surface-active agents are used as dispersants and may be obtained, for example, by reacting 28.4 parts of 1,6-hexanediol and 34.5 parts of 3,3,5-trimethylhexanol-1 with 37.1 parts POCl₃ at a temperature of 70° C. until gas evolution ceases, and then neutralizing with alkali; or by reacting 70 parts 3,3,5-trimethylhexanol-1 with 30 parts $POCl_3$ at 70° C. until gas evolution ceases and neutralizing; or by reacting 70 parts cetyl alcohol with 30 parts $POCl_3$ in the same manner and neutralizing with an alkali. Commercially available materials of this type include "Alipal GB 520" (a product made and sold by Antara Chemicals Co. comprising the sodium hydroxide alkalinized $POCl_3$ reaction product of a higher alcohol).

To the same dispersant effect is the addition of the reaction product of $H_3PO_4$ and tall oil neutralized with NaOH, for example, "Tallicin 120" (a product made and sold by Pflaumer Brothers Company comprising the NaOH neutralized reaction product of $H_3PO_4$ and tall oil).

The following examples are given to illustrate several preferred embodiments of this invention, it being understood that the details of these examples are in no way limitative of the scope of the invention.

Thermofluid glass color compositions are prepared by thoroughly mixing the following ingredients in the proportions tabulated while applying sufficient heat to melt the several ingredients except, of course, the glass frit colors. The glass frit colors are composed of 90% by weight of colorless glass frit having the following composition and 10% of ceramic color pigments:

| | Percent |
|---|---|
| PbO | 52.00 |
| $B_2O_3$ | 6.15 |
| $SiO_2$ | 31.00 |
| $TiO_2$ | 0.95 |
| $ZrO_2$ | 3.65 |
| ZnO | 1.98 |
| $Na_2O$ | 4.27 |
| | 100.00 |

Any glass frit color other than that set forth in the above specific example can be used equally well.

*Examples*

| Example No. | 1 | 2 | 3 | 4 | 5 |
|---|---|---|---|---|---|
| Ingredient: | | | | | |
| "Lucite 44" | 30 | 20 | 15 | 10 | 7 |
| "Lorol 28" | 63 | 80 | 82 | 87 | 88 |
| Ethyl Cellulose | 0 | 0 | 3 | 3 | 5 |
| Reaction Product of $POCl_3$ and Lauryl Alcohol | 7 | 0 | 0 | 0 | 0 |
| Glass Frit Color (in parts per 100 parts vehicle) | 450 parts | 450 parts | 400 parts | 450 parts | 450 parts |

The glass color compositons of the examples had a very low carbonaceous residue after firing and were compatible with at least 40% of known polyethylene ether glycol thermofluid compositions or "resin-wax" or "all-wax" vehicles of the types exemplified in U.S. Patents Nos. 2,607,701, 2,607,702, 2,682,480, 2,617,740, and 2,823,138. The thermofluid vehicles of the above examples also exhibited the many essential characteristics of thermofluid vehicles for use in glass colors. These vehicles exhibited good levelling and quick melting without running, were operable at varying room temperatures, had good aherence to glass and metal surfaces, maintained glass frit in good dispersion, and did not gel upon melting.

Throughout the specification and claims, any reference to parts, proportions and percentages refers to parts, proportions and percentages by weight unless otherwise specified.

Since it is obvious that many changes and modifications can be made in the above-described details without departing from the nature and spirit of the invention, it is to be understood that the invention is not to be limited to said details except as set forth in the appended claims.

I claim:
1. A thermofluid vehicle for glass color compositions at least 60% of which consists essentially of normal butyl methacrylate polymer having a parlin cup viscosity of between about 20 and 100 seconds for a 43% solution in toluene at 25° C. and a saturated monohydroxy aliphatic alcohol solid at room temperature and having 12 to 32 carbon atoms, said constituents being present in the ratio of 7 to 30 parts polymer and 63 to 88 parts alcohol.

2. The thermofluid vehicle of claim 1 containing, based on the weight of polymer and alcohol, up to 5% of ethyl cellulose and up to 7% of a reaction product of $POCl_3$ with a saturated monohydroxy aliphatic alcohol having 8 to 18 carbon atoms.

3. A glass color composition consisting essentially of a finely divided glass frit color and a thermofluid vehicle at least 60% of which consists essentially of normal butyl methacrylate polymer having a parlin cup viscosity of between about 20 and 100 seconds for a 43% solution in toluene at 25° C. and a saturated monohydroxy aliphatic alcohol solid at room temperature and having 12 to 32 carbon atoms, said constituents being present in the ratio of 7 to 30 parts polymer and 63 to 88 parts alcohol.

References Cited in the file of this patent

UNITED STATES PATENTS

| 2,045,979 | Crawford | June 30, 1936 |
| 2,316,274 | Mitchell | Apr. 13, 1943 |
| 2,682,480 | Andrews | June 29, 1954 |
| 2,823,138 | Hoffman | Feb. 11, 1958 |